BEAM CURRENT STABILIZING CIRCUIT
Filed May 17, 1965
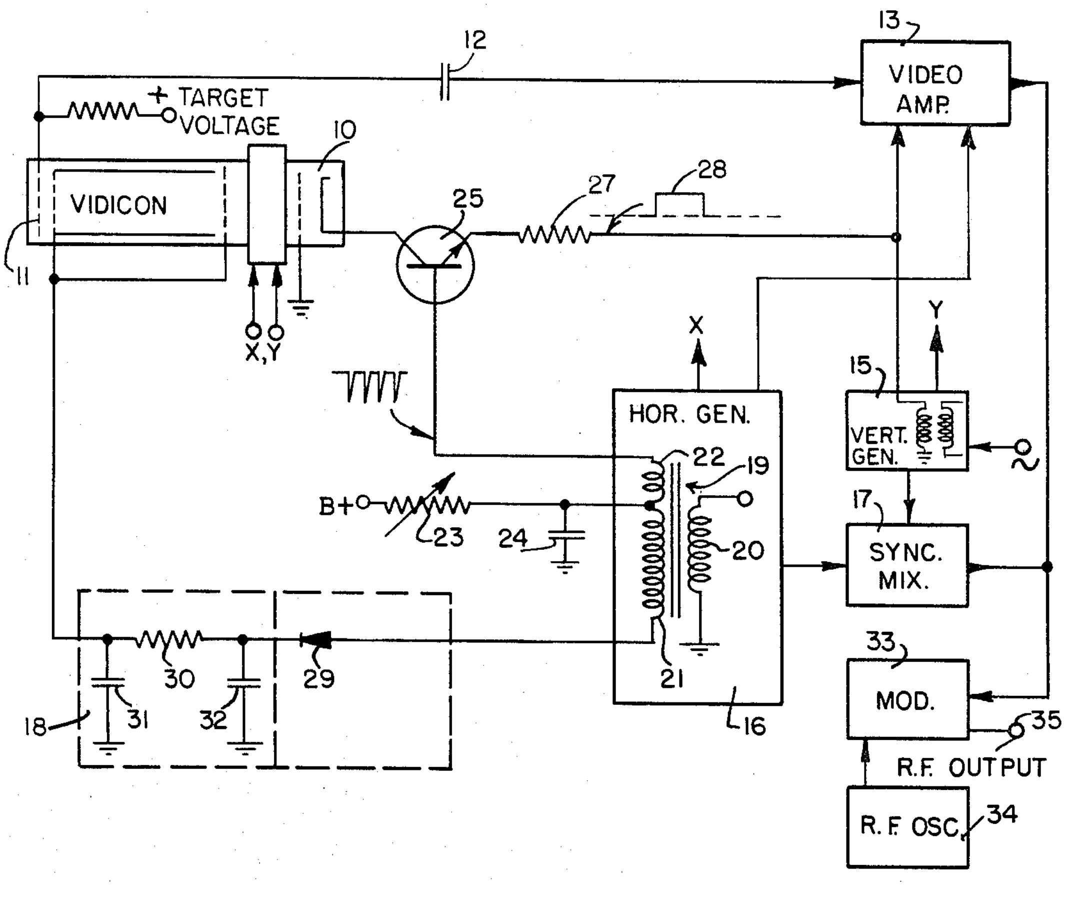
Inventor
De Loss J. Tanner
By Mueller, Aichele & Rauner
Attys.

United States Patent Office 3,414,667

Patented Dec. 3, 1968

3,414,667

BEAM CURRENT STABILIZING CIRCUIT

De Loss J. Tanner, Bensenville, Ill., assignor to Motorola, Inc., Franklin Park, Ill., a corporation of Illinois Filed May 17, 1965, Ser. No. 456,198

9 Claims. (Cl. 178—7.2)

ABSTRACT OF THE DISCLOSURE

The output of a horizontal blanking transformer is rectified and coupled to a vidicon for supplying a direct current potential to the focus and accelerating electrodes thereof. The collector of an NPN transistor is connected to the cathode of the vidicon and the emitter is connected to a vertical blanking generator. A direct current potential source is connected by a variable resistor to the secondary winding of the horizontal blanking transformer and the base electrode of the transistor is connected to the junction point of the variable resistor and secondary winding. As the current in the vidicon is reduced due to cathode aging, the bias on the base of the transistor changes to drive the transistor harder thereby increasing the current through the vidicon in an amount proportional to the amount decreased by cathode aging thereby maintaining a constant direct current therethrough.

The invention relates to a means for automatically controlling the beam current of television camera tubes and more particularly to a circuit for adjusting vidicon beam current so that it is constant with aging of the cathode.

As is well known, it is necessary to control the average beam current of a vidicon to keep the beam current optimally adjusted. Since television cameras should be as inexpensive and simple to operate as possible, particularly consumer type cameras, it is desirable that they automatically adjust for beam current decrease as a result of aging of the vidicon and consequent reduction of cathode emission. The user occasionally has had to readjust manually the vidicon beam current to compensate for such a decrease in cathode emission.

Presently used systems with television pick-up tubes include a circuit for cutting off the beam during retrace. This circuit usually needs at least one tube or transistor for the blanking stage.

It is an object of this invention to provide a television camera with improved beam current control.

Another object of the invention is to provide a vidicon television tube with a simple, inexpensive circuit for automatic readjustment of the beam current as a function of decrease in cathode emission.

Still another object of the invention is the combination of a beam regulation and blanking of the vidicon beam current in a single circuit.

Yet another object of the invention is to provide a constant load to the vidicon supply voltage source by virtue of the beam current being regulated. This eliminates the need for regulating the vidicon supply voltage against output load changes or the need for a vidicon supply voltage that a low source impedance.

In brief, the present invention may be used advantageously for a vidicon television camera tube for maintaining the beam current constant when the cathode emission of the tube decreases. The focus and accelerating electrodes of the vidicon are coupled through a rectifier circuit to a high voltage secondary winding of a horizontal output transformer. The other side of this high-voltage secondary winding is series connected with a low voltage secondary winding and a blanking amplifier which is coupled between the cathode electrode of the vidicon and a reference potential. The blanking amplifier may comprise two input circuits, one of which is coupled to the low voltage secondary winding for supplying horizontal blanking pulses and the other of which is coupled to a vertical generator for supplying vertical blanking pulses to the blanking amplifier. The junction of the high and the low voltage secondary windings is connected through a resistor of variable value with a low direct current voltage. The voltage drop across this resistor is coupled through the low voltage secondary winding to one input circuit of the blanking amplifier for applying to the vidicon cathode a bias potential which is inversely proportional to the beam current and which keeps the beam current automatically constant. Thus, only a single transistor is needed for both the beam regulation and blanking.

The drawing shows a television camera, partly schematic and partly in black, which incorporates the invention.

In the drawing, the television camera makes use of a vidicon tube 10, which has a light sensitive target 11 the resistance of which varies inversely with the amount of light falling on it. The target is coupled through a capacitor 12 to a video amplifier 13. Suitable alternating current of proper frequency is coupled to vertical generator 15 for developing the vertical signal by the controlled frequency of the alternating current source. The vertical generator is coupled to a sync generator and mixer 17 and the video amplifier 13. An automatic beam control and blanking circuit according to the invention is connected to the focus, accelerating and cathode electrodes of the vidicon tube and is also coupled to the output of the horizontal generator 16, to a direct current source, to one of the outputs of the vertical generator 15 and the input of the video amplifier 13.

The automatic beam control and blanking circuit comprises a horizontal output transformer 19 with a primary winding 20 connected with the horizontal output transistor (not shown), a high voltage secondary winding 21 and a low voltage secondary winding 22. A resistor 23 of variable value is connected between the junction of the high voltage and low voltage secondary windings and the direct current source. This junction is also connected through a shunt capacitor 24 to the reference potential. The opposite end of the low voltage secondary winding 22 is connected to the base of an NPN transistor 25, the collector of which is connected with the cathode electrode of the vidicon tube 10. The emitter of the NPN transistor 25 is connected through a resistor 27 to the vertical generator 15 from which blanking pulse 28 is supplied with respect to a reference potential which in this circuit is ground. The opposite end of the high voltage secondary winding 21 is series connected through a rectifier 29 and a low-pass filter 18 including a series resistor 30 and two shunt capacitors 31 and 32 with the focus and accelerating electrodes of the vidicon tube 10. The outputs of the video amplifier 13 and of the sync generator and mixer 17 go to a modulator 33 which may be a diode modulator. The composite video signal varies the conduction of the modulator diode to vary the amount of RF that gets through from an RF oscillator 34 resulting in a modulated RF output at an RF output terminal 35.

Referring now more particularly to the operation of the automatic beam control and blanking circuit, the vidicon beam current flows through the resistor 27, transistor 25, from the cathode electrode to the accelerating and focus electrodes of the vidicon 10, resistor 30, rectifier 29, high voltage secondary winding 21 and resistor 23. Since the base current of the transistor 25 is very small in comparison with the beam current, that portion of the current through resistor 23 may be neglected. The beam current through resistor 23 develops a voltage drop which during steady state conditions is equal to the B+ voltage minus the voltage at the base of transistor 25 determined by the voltage drop at resistor 27 and the voltage drop at the emitter-base path. As the vidicon ages and its cathode emission drops off, the beam current through resistor 23 is reduced. By this the voltage at the base increases with regard to the ground potential. This causes a larger voltage difference between base and emitter which renders transistor 25 more conductive in order to lower the cathode potential of the vidicon and to increase its cathode emission.

In some cases, resistor 27 may be eliminated, depending on the vertical generator's source impedance, output signal amplitude, or other factors. In other cases, for example when the baseline of the vertical generator output is irregular, it may be necessary to replace resistor 27 with a diode biased so as to clip off the distorted portion of the signal. Because this diode would be cut off during trace, it would also provide better isolation than a resistor in cases where better isolation would be necessary. An example of where good isolation is needed (during vertical trace time) between transistor 25 and vertical generator 15 is with a vertical generator circuit that is susceptible to the horizontal pulses that appear at the emitter of transistor 25 due to the horizontal blanking signal at the base.

During the occurrence of positive pulses from the vertical generator 15 beam current through transistor 25 is cut off. The beam current is also cut off by the negative horizontal sweep signals produced at the low voltage secondary winding 22 and applied to the base of transistor 25. In this way the video signal transferred from the target 11 to video amplifier 13 is interrupted during the horizontal and vertical blanking pulses. In order to prevent a change of the charging of capacitor 24 by the blanking pulses the capacitance should be large.

The great advantage of the invention is that only one transistor is used for both regulation and horizontal and vertical blanking of the vidicon beam current. Further by supplying the collector voltage via the vidicon beam, the collector voltage never can exceed the vidicon cutoff potential. Thus, the transistor breakdown voltage rating need not be as high as some other possible schemes having a collector load resistor to the accelerating supply voltage which is typically around 300 volts.

I claim:

1. A control system for a television camera tube having at least an accelerating electrode and a cathode electrode providing a beam current, said system including in combination, a high potential source coupled to the accelerating electrode for supplying a direct current thereto, amplifier means having an input circuit, said amplifier means having electrodes coupled between the cathode electrode and a reference potential, resistor means coupled between said high potential source and a reference potential and being responsive to the average of said beam current for developing a voltage drop thereacross, said input circuit being coupled to the junction of said high potential source and said resistor means for supplying said bias potential thereto, said bias potential being inversely proportional to said beam current for maintaining said beam current constant.

2. A control system for a television camera tube having at least an accelerating electrode and a cathode electrode providing a beam current, said system including in combination, an alternating current source, a direct current source, rectifier means coupled to said alternating current source, filter means connected between said rectifier means and the accelerating electrode to supply a direct current thereto, amplifier means having an input circuit, said amplifier means having electrodes coupled between the cathode electrode and a reference potential, resistor means coupled between said alternating current source and said direct current source and being responsive to the average of said beam current for developing a voltage drop thereacross, said voltage drop being coupled to said input circuit for supplying a bias potential thereto, said bias potential being inversely proportional to said beam current for maintaining said beam current constant.

3. A control system for a television camera tube having at least an accelerating electrode and a cathode electrode providing a beam current, said system including in combination, an alternating current source, a direct current source, rectifier means coupled to said alternating current source for producing a direct current, resistor means coupled between said rectifier means and the accelerating electrode, first capacitor means coupled between the junction of said rectifier and resistor means and a reference potential, second capacitor means coupled between the junction of said resistor means and the accelerating electrode and said reference potential, said resistor means, first capacitor and second capacitor means arranged in an R-C network comprising filter means, amplifier means having an input circuit, said amplifier means having electrodes coupled between the cathode electrode and said reference potential, second resistor means coupled between said alternating current source and said direct current source and being responsive to the average of said beam current for developing a voltage drop thereacross, said voltage drop being coupled to said input circuit for supplying a bias potential thereto, said bias potential being inversely proportional to said beam current for maintaining said beam current constant.

4 A control system for a television camera tube having at least an accelerating electrode and a cathode electrode providing a beam current, said system including in combination, an alternating current source, a direct current source, rectifier means coupled to said alternating current source for producing a direct current, filter means connected between said rectifier means and the accelerating electrode to supply said direct current thereto, amplifier means having an input circuit, said amplifier means having electrodes coupled between the cathode electrode and a reference potential, resistor means coupled between said alternating current source and a direct current source the value of which resistor means being variable, capacitor means connected between said alternating current source and said reference potential bypassing said resistor means and said direct current source, said resistor means being responsive to the average of said geam current for developing a voltage drop thereacross, said voltage drop being coupled to said input circuit for supplying a bias proportional to said beam current for maintaining said beam current constant.

5 A control system for a television camera tube having at least an accelerating electrode and a cathode electrode providing a beam current, said system including in combination, an alternating current source, rectifier means coupled to said alternating current source for producing a direct current, low pass filter means coupled between said rectifier means and the accelerating electrode, amplifier means having an input circuit, said amplifier means having electrodes coupled between the cathode electrode and said reference potential, resistor means coupled between said alternating current source and a direct current source the value of which resistor means being variable, capacitor means connected between said alternating current source and said reference potential bypassing said resistor means and said direct current source, said resistor means being responsive to the average of said beam current for developing a voltage drop thereacross, said voltage drop being coupled to said input circuit for supplying a bias potential thereto, said bias potential being inversely proportional to said beam current for maintaining said beam current constant.

6 A control system for a television camera tube having at least an accelerating electrode and a cathode electrode providing a beam current, said system including in combination, a horizontal blanking output transformer having a high voltage secondary winding and a low voltage secondary winding one side of each being connected together, capacitor means connected betwen the junction of said windings and a reference potential, rectifier means coupled to the other side of said first high voltage secondary winding for producing a direct current, filter means coupled between said rectifier means and the accelerating electrode for supplying said direct current thereto, a blanking amplifier having an input circuit, said blanking amplifier having electrodes coupled between the cathode electrode and said reference potential, resistor means coupled between said junction of said windings and a direct current source reference potential and being responsive to said direct current for developing a voltage drop thereacross, said input circuit connected to the other side of said low voltage secondary winding which supplies blanking pulses to said blanking amplifier, said voltage drop being coupled to said input circuit for supplying the bias potential thereto, said bias potential being inversely proportional to said beam current for maintaining beam current constant.

7 A control system for a television camera tube having at least an accelerating electrode and a cathode electrode providing a beam current, said system including in combination, a horizontal blanking output transformer having a high voltage secondary winding and a low voltage secondary winding, said windings being interconnected, capacitor means connected between the junction of said windings and a reference potential, rectifier means coupled to the other side of said high voltage secondary winding for producing a direct current, first resistor means coupled between said rectifier means and the accelerating electrode, first capacitor means coupled between the junction of said rectifier and said first resistor means and a reference potential, second capacitor means coupled between the junction of said first resistor means and the accelerating electrode and said reference potential, said first resistor means, first capacitor and second capacitor means arranged in a Pi network comprising filter means, a blanking amplifier having an input circuit, said blanking amplifier having electrodes coupled betwen the cathode electrode and said reference potential, second resistor means coupled betwen said junction of said windings and a direct current reference potential and being responsive to said direct current for developing a voltage drop thereacross, said input circuit connected to the other side of said low voltage secondary winding for supplying blanking pulses to said blanking amplifier, said voltage drop being coupled through said low voltage secondary winding to said input circuit for supplying a bias potential thereto, said bias potential being inversely proportional to said beam current for maintaining the beam current constant.

8. A control system for a television camera tube having at least an accelerating electrode and a cathode electrode providing a beam current, said system comprising in combination, a horizontal blanking output transformer having a first high voltage secondary winding and a second low voltage secondary winding, said windings being interconnected, capacitor means connected between the junction of said windings and a reference potential, first rectifier means coupled to the other side of said first high voltage secondary winding for producing a direct current, low pass filter means coupled between said first rectifier means and the accelerating electrode, a blanking amplifier having a first input circuit and a second input circuit, said blanking amplifier having an electrode connected to the cathode electrode and being connected to said reference potential by said second input circuit, resistor means coupled between the junction of said windings and a direct current reference potential and being responsive to said direct current for developing a voltage drop thereacross, said first input circuit connected to the other side of said second low voltage secondary winding for supplying negative horizontal blanking pulses to said blanking amplifier, coupling means for supplying positive vertical blanking pulses to said second input circuit of said blanking amplifier, said voltage drop being coupled through said low voltage secondary winding to said first input circuit for supplying a bias potential thereto, said bias potential being inversely proportional to said beam current for maintaining beam current constant.

9. A control system for a vidicon television camera tube having at least an accelerating electrode and a cathode electrode providing a beam current, said system comprising in combination, a horizontal blanking output transformer having a first high voltage secondary winding and a second low voltage secondary winding, said windings being interconnected, a first capacitor connected between the junction of said windings and a reference potential, a first rectifier connected to the other side of said first high voltage secondary winding for producing a direct current, a first resistor connected between said first rectifier and the accelerating electrode, a second capacitor connected between the junction of said first rectifier and said first resistor and said reference potential, a third capacitor connected between the junction of said resistor and the accelerating electrode and said reference potential, said first resistor, second and third capacitors arranged in a Pi network comprising filter means, a blanking amplifier including an NPN transistor having a collector, a base and an emitter, said collector connected to the cathode electrode, said base connected to the other side of said second low voltage secondary winding which supplies negative horizontal blanking pulses to said blanking amplifier, coupling means for supplying positive vertical blanking pulses to said emitter of said blanking amplifier, a third resistor connected between the junction of said windings and a low positive direct current voltage, the value of said third resistor being variable and responsive to said beam current for developing a voltage drop thereacross, said voltage drop being coupled through said second low voltage secondary winding to said base for supplying a bias potential to said NPN transistor, said bias potential being inversely proportional to the beam current to maintain said beam current constant with aging of said cathode electrode.

References Cited

UNITED STATES PATENTS 2,911,561 11/1959 Fathauer.
3,145,321 8/1964 Sadashige.

ROBERT L. GRIFFIN, *Primary Examiner.*

R. K. ECKERT, Jr., *Assistant Examiner.*